US012339711B2

United States Patent
Tsorng et al.

(10) Patent No.: US 12,339,711 B2
(45) Date of Patent: Jun. 24, 2025

(54) SERVER WITH SOLID STATE DRIVE MODULES COMPATIBLE WITH LOW PROFILE PCIE FORM FACTORS

(71) Applicant: Quanta Computer Inc., Taoyuan (TW)

(72) Inventors: Yaw-Tzorng Tsorng, Taoyuan (TW); Tung-Hsien Wu, Taoyuan (TW); Chin-Ho Kuo, Taoyuan (TW); Yu-Hsuan Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 200 days.

(21) Appl. No.: 18/059,631

(22) Filed: Nov. 29, 2022

(65) Prior Publication Data

US 2024/0176398 A1   May 30, 2024

(51) Int. Cl.
*G06F 1/16* (2006.01)
*G06F 13/40* (2006.01)

(52) U.S. Cl.
CPC ........ *G06F 1/1658* (2013.01); *G06F 13/4022* (2013.01); *G06F 2213/0026* (2013.01)

(58) Field of Classification Search
CPC ............... G06F 1/1658; G06F 13/4022; G06F 2213/0026; G06F 1/187; H05K 5/0069; H01R 13/62938; G11B 33/128
See application file for complete search history.

(56) References Cited

U.S. PATENT DOCUMENTS

| | | | |
|---|---|---|---|
| 7,827,570 B2 * | 11/2010 | Suzuki ................. | G11B 15/675 720/639 |
| 10,929,327 B1 * | 2/2021 | Schrempp ........... | G06F 13/4068 |
| 2010/0254100 A1 * | 10/2010 | Kim ...................... | H05K 7/1461 361/752 |
| 2019/0079890 A1 * | 3/2019 | Matula ................ | G06F 13/4045 |
| 2019/0272008 A1 * | 9/2019 | Ping ..................... | H05K 7/1487 |
| 2021/0132667 A1 * | 5/2021 | Wong ...................... | G06F 1/183 |
| 2023/0384822 A1 * | 11/2023 | Lee ......................... | G06F 1/1652 |
| 2023/0389214 A1 * | 11/2023 | Zhong .................. | H05K 7/1489 |
| 2024/0081015 A1 * | 3/2024 | Liu ....................... | H05K 7/1487 |

* cited by examiner

*Primary Examiner* — Allen L Parker
*Assistant Examiner* — Peter Krim
(74) *Attorney, Agent, or Firm* — NIXON PEABODY LLP

(57) ABSTRACT

A carrier for solid state devices includes a plurality of panels, at least one gate, and an addition. The plurality of panels includes a first panel, a second panel, and a third panel. The at least one gate is attached to the second panel and the third panel. The at least one gate is configured to be in one of a first position or a second position. When the at least one gate is in the first position, an opening for receiving solid state devices is at least partially occluded to a first width that is smaller than a length of one of the solid state devices. When the at least one gate is in the second position, the opening for receiving the solid state devices is increased to a second width that is larger than the length of the one of the solid state devices.

20 Claims, 13 Drawing Sheets

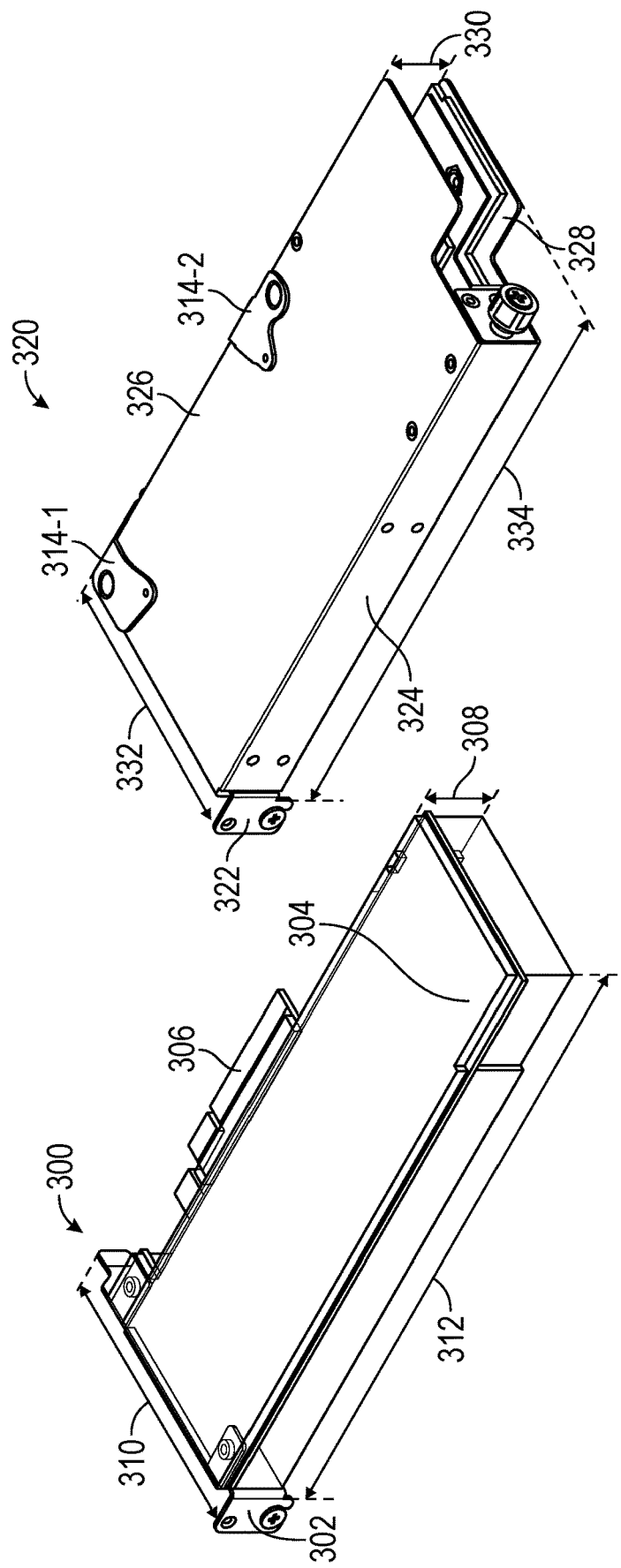

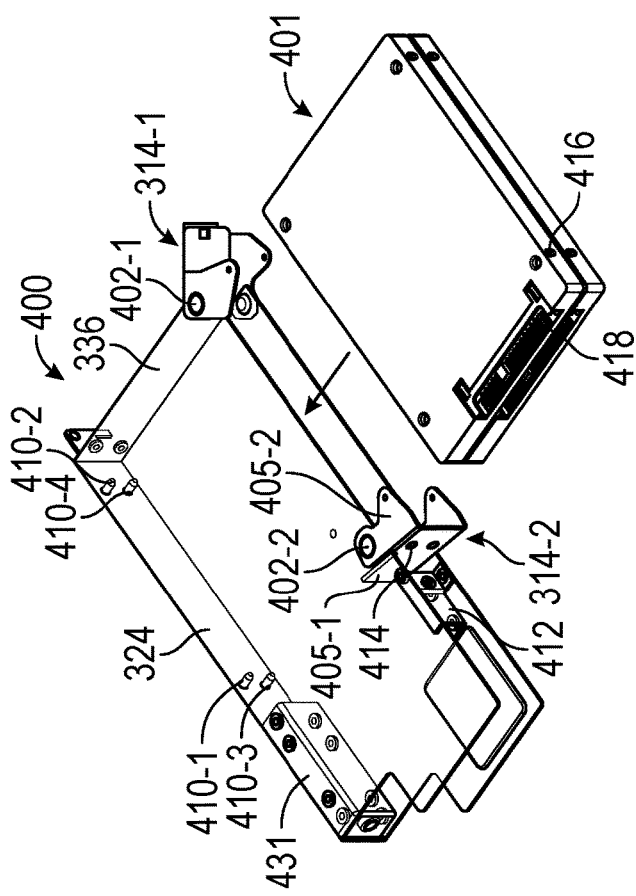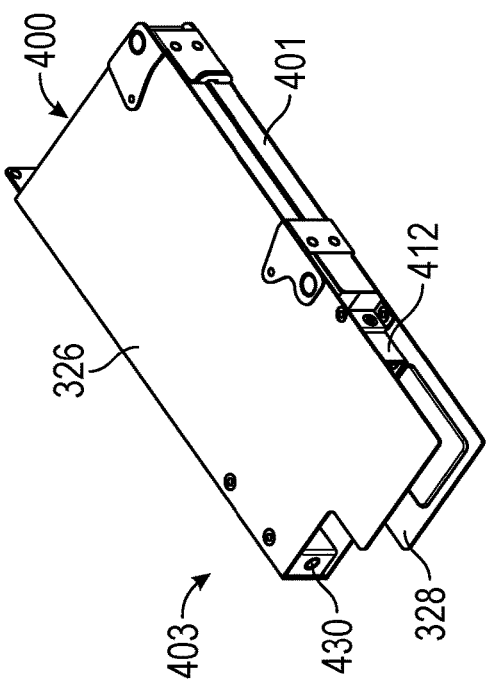

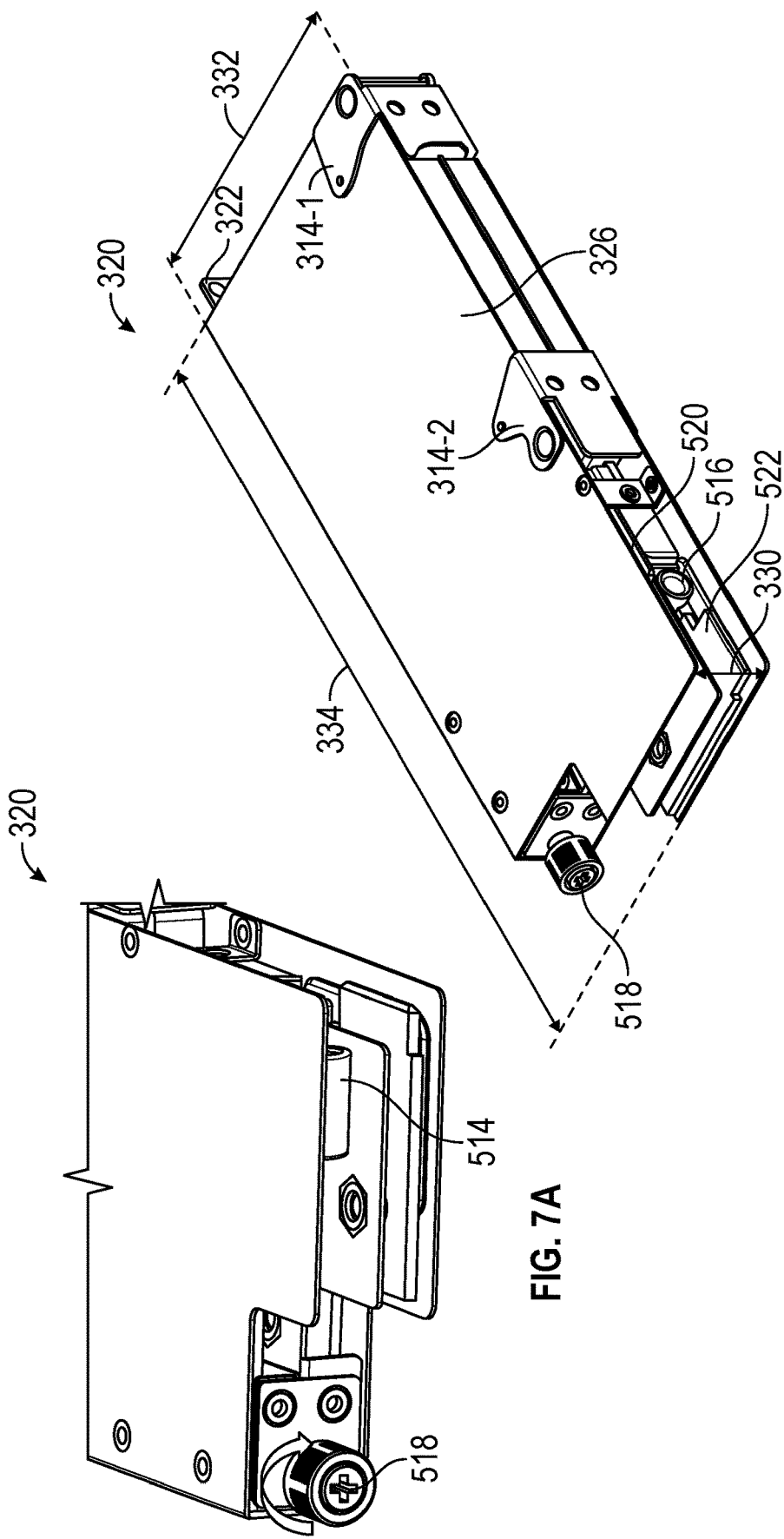

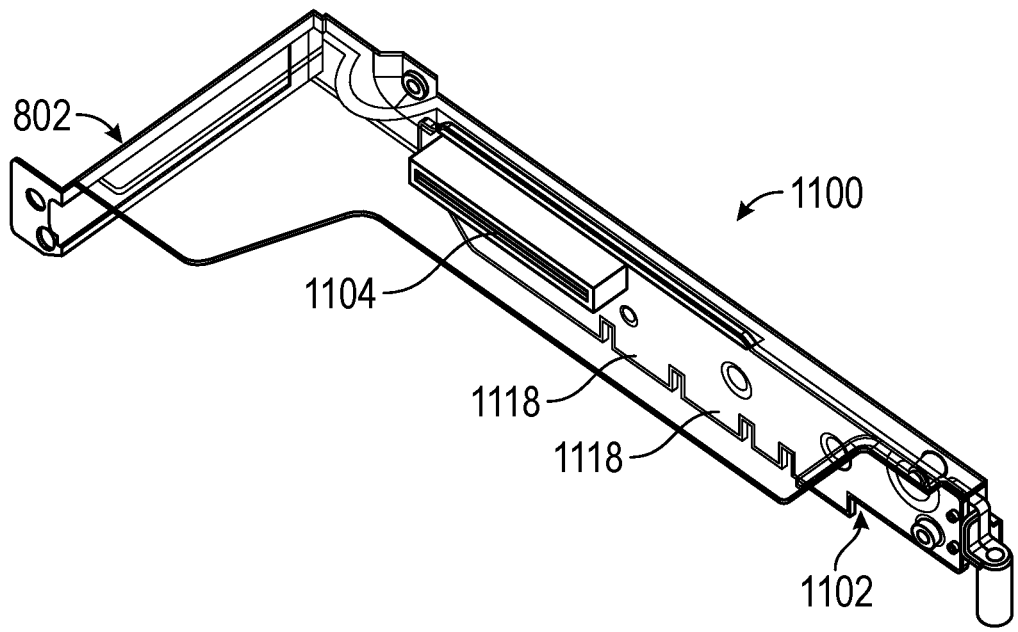
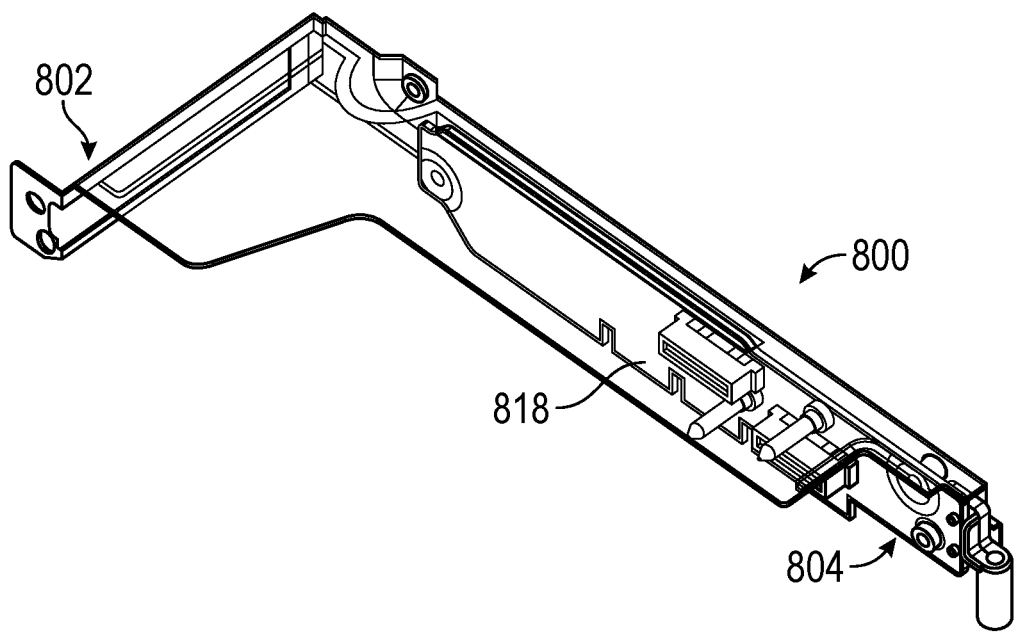
FIG. 11

SERVER WITH SOLID STATE DRIVE MODULES COMPATIBLE WITH LOW PROFILE PCIE FORM FACTORS

TECHNICAL FIELD

The present disclosure relates generally to systems and methods for reconfiguring a server for swappable solid state drive modules and Peripheral Component Interconnect Express (PCIe) cards.

BACKGROUND

Servers are employed in a large number of applications ranging from high-performance computing to database storage. Servers enable many computing application solutions that have come to be relied upon. For example, servers may support mobile application solutions such as mobile mapping applications, mobile payment systems, text messaging, computation offloading, web browsing, etc. Mobile customers are usually unaware of extensive support being provided by servers in everyday use of their mobile devices. Although mobile customers may not consider server-side support in everyday use of mobile devices, components that make up the server affects performance of the server, and in some cases, features available for computing. Thus, servers sometimes need to be configured to include specific components or need to be upgradable to include specific components.

The components needed typically depend on the service being provided. For example, a server can need multiple storage devices and only a few PCIe cards. Since storage devices and PCIe cards have different form factors and each connect to the motherboard differently, the configuration and physical placement of these components are motherboard-layout dependent. Therefore, when needs of a computing system changes and more PCIe cards or SSD modules need to be added or removed, the locations for adding these components are very limited. The present disclosure provides ways of increasing flexibility when upgrading, or manufacturing, computing systems.

SUMMARY

Some implementations of the present disclosure provide a carrier for solid state devices includes a plurality of panels, at least one gate, and an addition. The plurality of panels includes a first panel, a second panel, and a third panel. The at least one gate is attached to the second panel and the third panel. The at least one gate is configured to be in one of a first position or a second position. When the at least one gate is in the first position, an opening for receiving solid state devices is at least partially occluded to a first width that is smaller than a length of one of the solid state devices. When the at least one gate is in the second position, the opening for receiving the solid state devices is increased to a second width that is larger than the length of the one of the solid state devices. The addition is attached to the second panel and the third panel, and the addition is configured to interface with a printed circuit board assembly (PCBA).

In an embodiment, the carrier further includes one or more aligning pins provided on the first panel. The one or more aligning pins is configured to interface with one or more holes of the solid state devices. In an embodiment, the at least one gate includes a first gate and a second gate. The first gate is pivotable about a first axis and the second gate is pivotable about a second axis that is different from the first axis. In an embodiment, the first gate and the second gate are each configured to pivot between the first position and the second position. In an embodiment, the first gate includes a stub facilitating pivoting between the first position and the second position. In an embodiment, the carrier further includes an inner bracket for receiving the printed circuit board assembly. The inner bracket can be secured to the second panel and the third panel.

Some implementations of the present disclosure provide a solid state device (SSD) module including an SSD carrier and a PCBA assembly. The SSD carrier includes a carrier for solid state devices includes a plurality of panels, at least one gate, an addition, and one or more aligning pins. The plurality of panels includes a first panel, a second panel, and a third panel. The at least one gate is attached to the second panel and the third panel. The at least one gate is configured to be in one of a first position or a second position. When the at least one gate is in the first position, an opening for receiving solid state devices is at least partially occluded to a first width that is smaller than a length of one of the solid state devices. When the at least one gate is in the second position, the opening for receiving the solid state devices is increased to a second width that is larger than the length of the one of the solid state devices. The addition is attached to the second panel and the third panel, and the addition is configured to interface with the PCBA. The one or more aligning pins is provided on the first panel, and the one or more aligning pins is configured to interface with one or more holes of the solid state devices. The PCBA includes at least one SSD backplane.

In an embodiment, the PCBA further includes an SSD backplane sled attached to the at least one SSD backplane. In an embodiment, a first SSD backplane is attached to a first side of the SSD backplane sled, and a second SSD backplane is attached to a second side of the SSD backplane sled. The first side and the second side are opposite sides. In an embodiment, the first SSD backplane is shaped differently from the second SSD backplane. In an embodiment, each of at least one SSD backplane includes an SSD connector for interfacing with solid state drives and connecting traces for interfacing with a riser board. In an embodiment, each of the at least one SSD backplane includes guides for positioning the PCBA relative to a riser board. In an embodiment, dimensions of the SSD module are about the same as dimensions of a low profile PCIe card.

Some implementations of the present disclosure provide a computing device including a chassis, a motherboard coupled to the chassis, an SSD module, and a first riser module coupled to the SSD module. The SSD module includes an SSD carrier and a PCBA including at least one SSD backplane. The SSD carrier includes a carrier for solid state devices includes a plurality of panels, at least one gate, and an addition. The plurality of panels includes a first panel, a second panel, and a third panel. The at least one gate is attached to the second panel and the third panel. The at least one gate is configured to be in one of a first position or a second position. When the at least one gate is in the first position, an opening for receiving solid state devices is at least partially occluded to a first width that is smaller than a length of one of the solid state devices. When the at least one gate is in the second position, the opening for receiving the solid state devices is increased to a second width that is larger than the length of the one of the solid state devices. The addition is attached to the second panel and the third panel, and the addition is configured to interface with the PCBA. The first riser module is configured to couple the SSD module to the motherboard via the PCBA.

In an embodiment, the first riser module includes a riser bracket and a first riser board. The first riser board includes at least one connector configured to receive connecting traces of the PCBA. In an embodiment, the first riser board further includes at least one guiding pin configured to interface with guides provided on the PCBA. In an embodiment, the first riser module connects to the motherboard using a same connection method as a PCIe module. In an embodiment, dimensions of the SSD module are about the same as dimensions of a low profile PCIe card. In an embodiment, the SSD module is installed at a first location on the motherboard, the first location being able to accommodate either an SSD module installation or a PCIe card module installation.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of embodiments together with reference to the accompanying drawings.

FIG. 3A illustrates a PCIe card with a low profile PCIe form factor, according to some implementations of the present disclosure.

FIG. 3B illustrates an SSD module, according to some implementations of the present disclosure.

FIG. 4A illustrates a perspective view of an SSD carrier of the SSD module of FIG. 3B, according to some implementations of the present disclosure.

FIG. 4B illustrates the SSD carrier of FIG. 4A in an open configuration for receiving SSDs, according to some implementations of the present disclosure.

FIG. 4C illustrates the SSD carrier of FIG. 4A in a closed configuration after receiving the SSDs, according to some implementations of the present disclosure.

FIG. 7A illustrates securing the SSD carrier of FIG. 6 to the PCBA.

FIG. 7B illustrates a perspective view of the SSD carrier of FIG. 6 after securing the PCBA.

FIG. 11 illustrates the first riser module and a second riser module, according to some implementations of the present disclosure.

Figure 1:
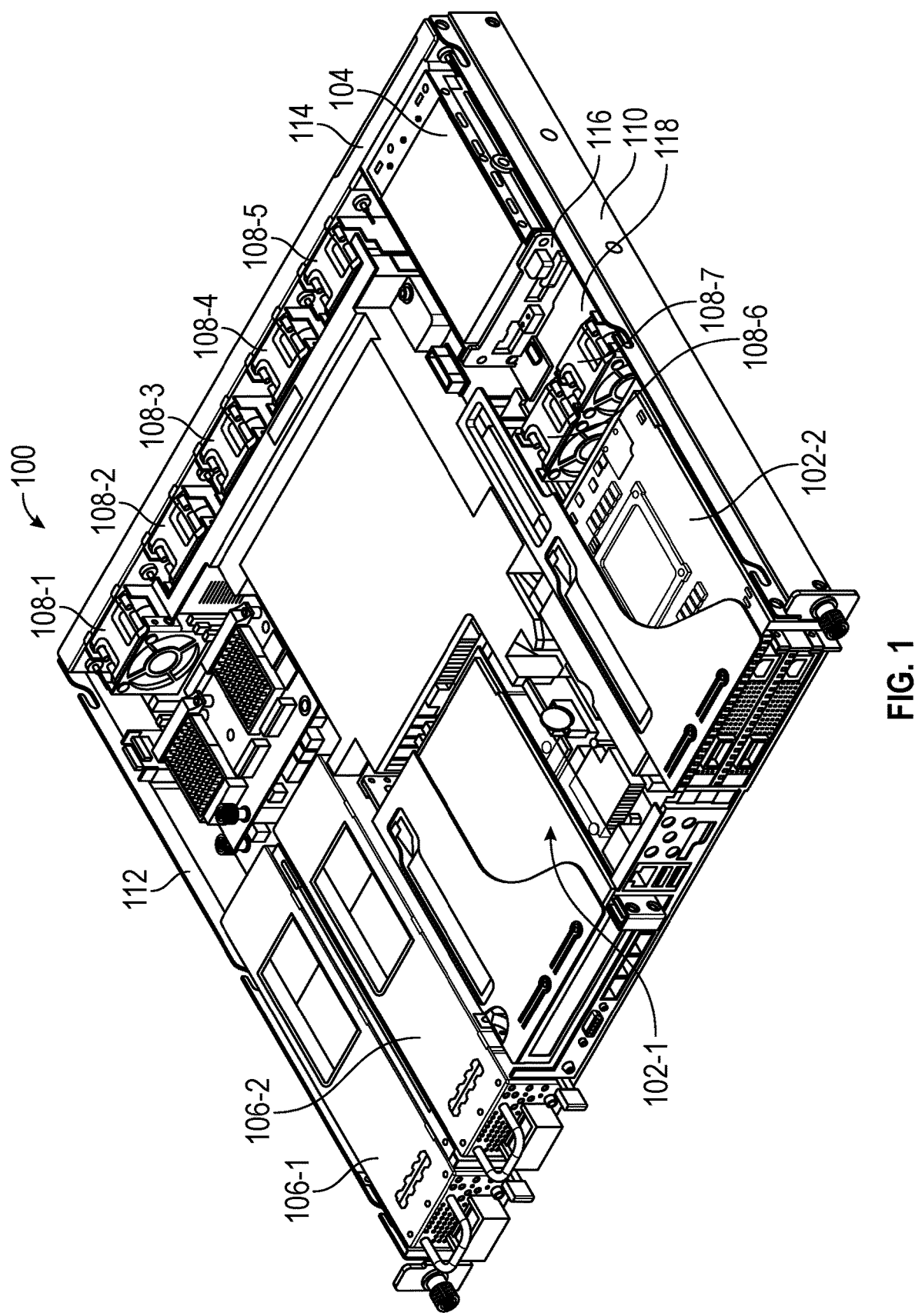
FIG. 1 illustrates a perspective view of a computing system, according to some implementations of the present disclosure.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Embodiments of the present disclosure provide solid state drive modules with a form factor that approximates those of low profile peripheral component interconnect express (PCIe) card modules. The PCIe card modules and the solid state drive modules can connect to the motherboard in a similar manner. An advantage of having similar form factors for both solid state drive modules and PCIe card modules is that a computing system with physical space limitations can be easily reconfigured to swap a solid state drive module for a PCIe card module, and vice versa. As such, a computing system provided in accordance with embodiments of the present disclosure can provide more flexibility to manufacturers for placement of components within the computing system. Manufacturers do not have to change motherboards to accommodate the different component placements.

FIG. 1 illustrates a perspective view of a computing system 100, according to some implementations of the present disclosure. The computing system 100 can be a server, a desktop computer, etc. The computing system 100 includes a chassis with a first side 110, a second side 114, and a third side 112. The chassis houses one or more components. The computing system 100 can include one or more electronic components. The components, for example, may include a motherboard 118, one or more fans (e.g., fans 108-1, 108-2, 108-3, 108-4, 108-5, 108-6, 108-7), one or more power supply units (e.g., power supply units 106-1, 106-2), one or more solid state drive (SSD) modules 104, and one or more PCIe card modules 102-1, 102-2. The motherboard 118 can include a set of memory (not shown), and processors (not shown). The motherboard 118 can include connectors (not shown) for connecting the different electronic components. For example, the SSD module 104 is connected to a first printed circuit board (PCB) 116 that provides connectors for electrically connecting the SSD module 104 to the motherboard 118.

Figure 2B:
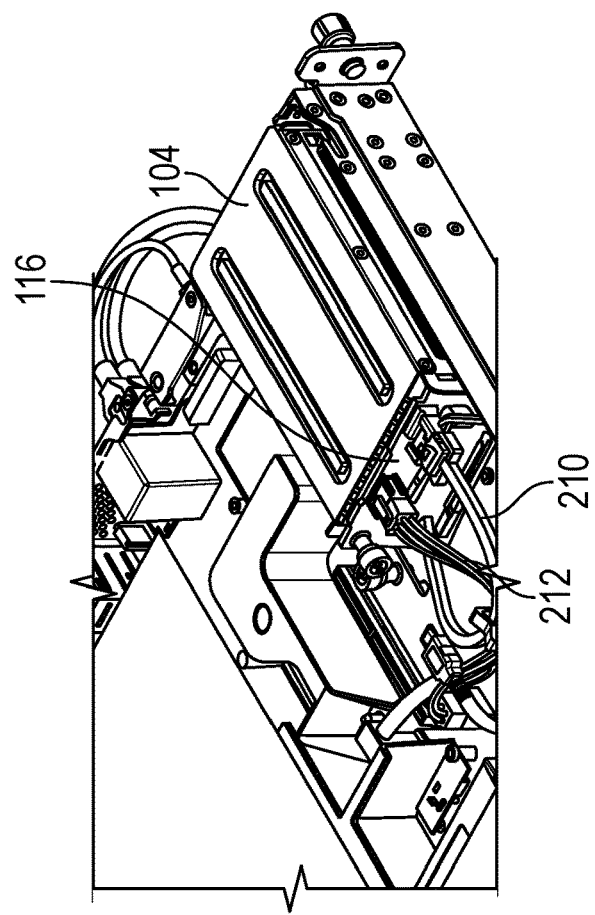
FIG. 2B illustrates a solid state drive (SSD) module of the computing system of FIG. 1.
Figure 2A:
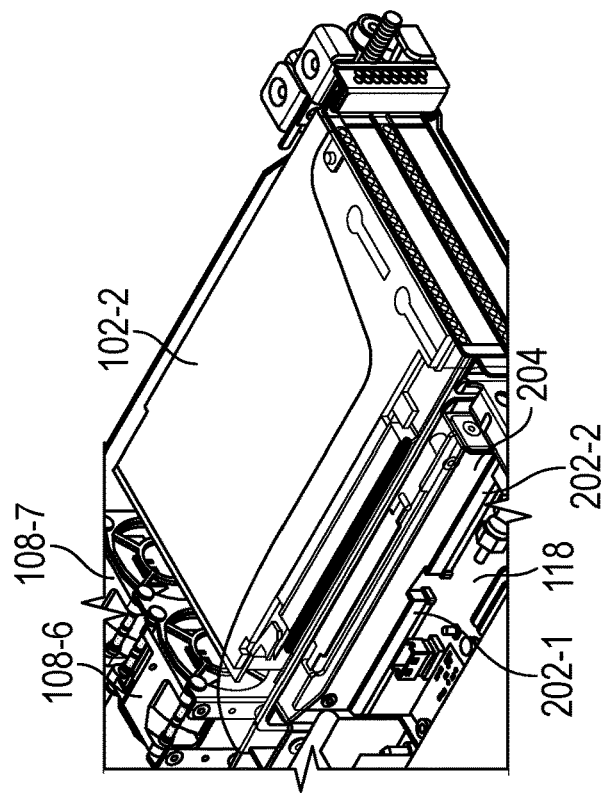
FIG. 2A illustrates a PCIe card module of the computing system of FIG. 1.

The computing system 100 is shown to include two PCIe card modules 102-1 and 102-2 and one SSD module 104. The PCIe card modules 102-1, 102-2 and the SSD module 104 have different dimensions and connections to the motherboard as shown in FIGS. 2A and 2B. FIG. 2A illustrates the PCIe card module 102-2 with connectors 202-1, 202-2 for connecting the PCIe card module 102-2 to the motherboard 118. The PCIe card module 102-2 is connected to a riser card 204, and the riser card 204 connects to the connectors 202-1, 202-2 on the motherboard 118. FIG. 2B illustrates the SSD module 104 attached to the first PCB 116. The first PCB 116 provides connectors for a power cable 212 and a data cable 210. The data cable 210 connects the SSD module 104 to the motherboard 118. Due to the SSD module 104 and the PCIe card module 102-2 having different connections to the motherboard 118, position and placement of the SSD module 104 and the PCIe card module 102-2 are not interchangeable. Embodiments of the present disclosure provide different designs for SSD modules to enable interchangeability between SSD modules and PCIe card modules.

FIG. 3A illustrates a PCIe card 300 with a low profile PCIe form factor, according to some implementations of the present disclosure. The PCIe card includes an L-shaped bracket 302 attached to a second PCB 304. The second PCB 304 includes connector extensions 306 for connecting the PCIe card 300 to a circuit board (e.g., the riser card 204 of FIG. 2A). The PCIe card 300 has a height 308, a length 312, and a width 310. In some implementations, the length 312 is about 181 mm, the width 310 is about 80 mm, and the height 308 is about 23 mm.

FIG. 3B illustrates an SSD module 320, according to some implementations of the present disclosure. The SSD module 320 includes one or more SSDs (not shown), a tab 322, one or more gates 314-1, 314-2, and an SSD carrier 400 (FIG. 4A) that includes a first panel 324, a second panel 326, a third panel 328, and a fourth panel 336 (FIG. 4B). The SSD module 320 has an SSD module height 330, an SSD module width 332, and an SSD module length 334. In some implementations, the SSD module length 334 is about 180 mm, the SSD module width 332 is about 76 mm, and the SSD module height 330 is about 23 mm. In some implementations, the SSD module 320 has exact same dimensions as the PCIe card 300 (FIG. 3A).

FIG. 4A illustrates a perspective view of the SSD carrier 400 of the SSD module 320 (FIG. 3B), according to some implementations of the present disclosure. The SSD carrier 400 can be configured in an open configuration or in a closed configuration. The SSD carrier 400 is shown in the closed configuration in FIG. 4A. When in the closed configuration, the gates 314-1 and 314-2 are in a first position. The gates 314-1, 314-2 at least partially occlude an opening for receiving SSDs when in the first position. The gates 314-1, 314-2 can include dimples 408-1, 408-2 for increasing the friction between the gates 314-1, 314-2 and the second panel 326. In some implementations, dimples can also be provided to increase friction between the gates 314-1, 314-2 and the third panel 328. The gates 314-1, 314-2 can pivot about axes 402-1, 402-2, respectively. In some implementations, a stub 406 can be provided on the gates 314-1, 314-2 to facilitate pivoting the gates 314-1, 314-2 with a tool or a user's hand. The dimples 408-1, 408-2 allow the gates to remain in the first position, preventing the gates from pivoting when no force is applied (e.g., using the tool or the user's hand) to cause the pivoting. The dimples 408-1, 408-2 provide a space-saving solution for preventing unwanted pivoting from the gates 314-1, 314-2. The arrows 404-1, 404-2 show direction of pivot for changing the gates from the first position to a second position. When the gates are in the second position, the SSD carrier 400 is in the open configuration.

FIG. 4B illustrates the SSD carrier 400 in the open configuration receiving SSDs 401, according to some implementations of the present disclosure. The second panel 326 is made see-through to illustrate internal structures of the SSD carrier 400. The gates 314-1, 314-2 are in the second position. When in the second position, spacing between the gates 314-1, 314-2 is widened, allowing enough room for the SSDs 401 to slide in or slide out of the SSD carrier 400. That is, the opening for receiving the SSDs 401 is widened and no longer occluded when the gates 314-1, 314-2 are in the second position. In the first position, the opening for receiving the SSDs 401 is smaller than a length of one of the SSDs. In the second position, the opening for receiving the SSDs 401 is wider than the length of one of the SSDs.

Two SSDs 401 are illustrated in FIG. 4B as an example, but in some implementations, the SSD carrier 400 can accept one SSD. In an example, the two SSDs are 7 mm SSDs. The SSDs 401 include SSD connectors 418 and holes 416. Furthermore, two gates 314-1, 314-2 are provided as examples. In some implementations, only one gate is provided. In some implementations, when one gate is provided, the length of the one gate is about the distance between the axes 402-1 and 402-2. In some implementations, when one gate is provided, the length of the one gate is determined to be a length that only partially occludes the spacing between the axes 402-1 and 402-2. Referring back to FIG. 4B, the first gate 314-1 is provided at a corner of the SSD carrier 400, and the second gate 314-2 is provided along a length of the SSD carrier 400. The locations of the gates 314-1, 314-2 are provided as examples.

The SSD carrier 400 includes one or more aligning pins 410-1, 410-2, 410-3, 410-4 that match one or more holes (e.g., holes 416) of the SSDs 401. The aligning pins 410-1, 410-2, 410-3, 410-4 are provided on the first panel 324. The aligning pins 410-1, 410-2, 410-3, 410-4 ensure that the SSDs 401 are placed in a preferred location and position in the SSD carrier 400. In some implementations, similar aligning pins 414 (or dimples) may be placed on the gates 314-1, 314-2 to match the holes 416 of the SSDs 401. The SSDs 401 are oriented such that the SSD connectors 418 are closer to the gate 314-2 than the fourth panel 336. The second panel 326 and the third panel 328 prevent the gate 314-2 from further rotation about the axis 402-2 in the direction indicated by the arrow 404-2 (FIG. 4A), when the gate 314-2 is in the second position. The gate 314 includes a tab 405-1 and a gate surface 405-2 such that the second panel 326 fits within a spacing between the tab 405-1 and the gate surface 405-2 while the gate 314-2 is rotated about the axis 402-2 in the direction indicated by the arrow 404-2 (FIG. 4A). The gate 314-2 is rotatable in the direction indicated by the arrow 404-2 until the tab 405-1 is completely within a spacing between the second panel 326 and the third panel 328 as shown in FIG. 4B. FIG. 4C illustrates the SSD carrier 400 in the closed configuration after receiving the SSDs 401, according to some implementations of the present disclosure. The SSD carrier 400 and the SSDs 401 form a carrier-SSD combination 403. A hole 430 is provided along an addition 431 (FIG. 4B) secured to the first panel 324. The addition 431 is secured to the second panel 326 and the third panel 328. When the SSDs 401 are installed in the SSD carrier 400, the SSD connectors 418 of the SSDs 401 still need to be accessible for connecting the SSDs 401 to the motherboard of the computing system (e.g., the motherboard 118).

Figure 5B:
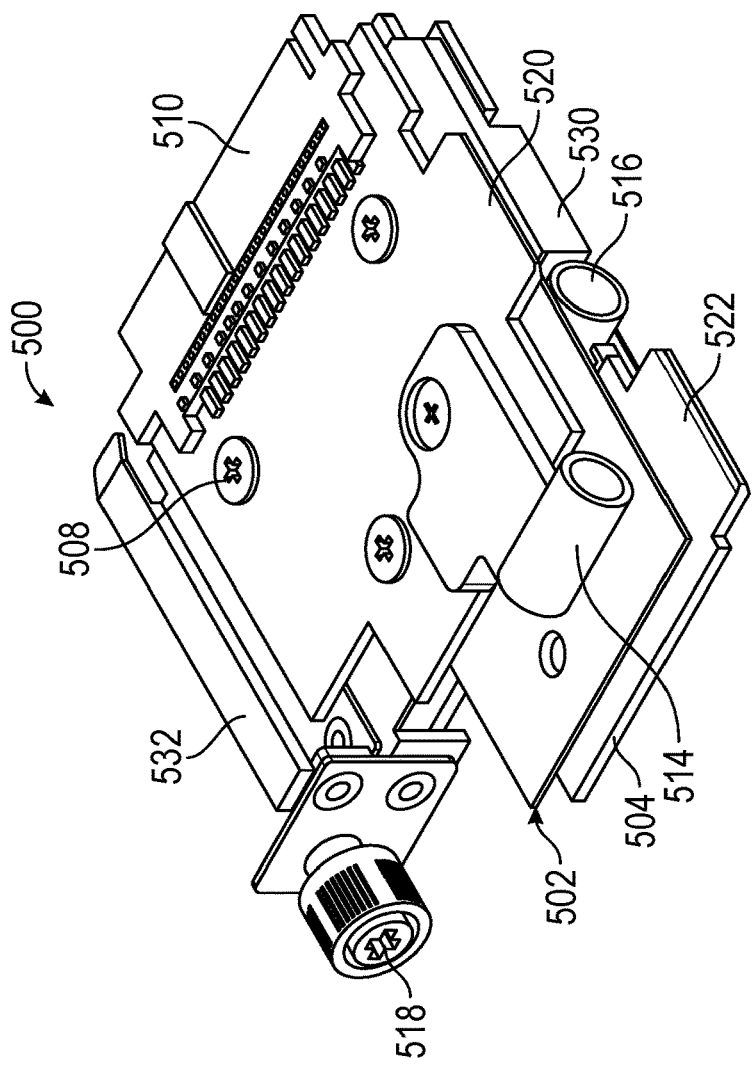
FIG. 5B illustrates a perspective view of the PCBA of FIG. 5A.
Figure 5A:
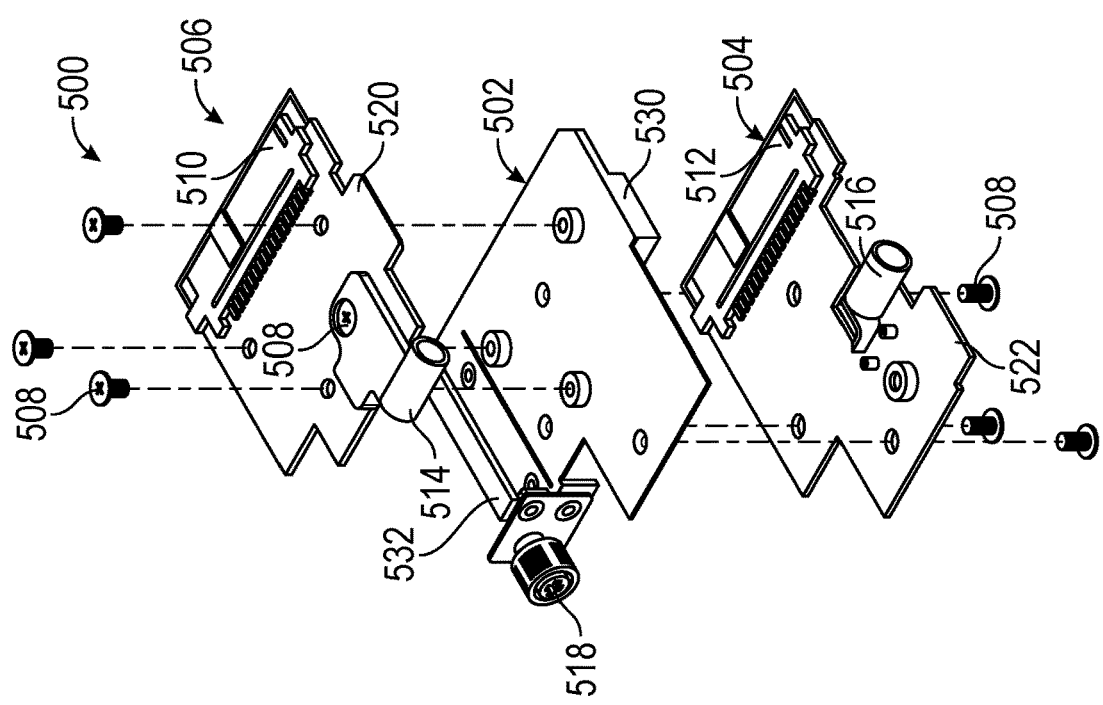
FIG. 5A illustrates an exploded view of a printed circuit board assembly (PCBA) for use in the SSD module of FIG. 3B, according to some implementations of the present disclosure.

A printed circuit board assembly (PCBA) can be used to access the SSD connectors 418 of the SSDs 401. FIG. 5A illustrates an exploded view of a PCBA 500 for use in the SSD module 320, according to some implementations of the present disclosure. FIG. 5B illustrates a perspective view of the PCBA 500 when assembled. The following description refers to both FIGS. 5A and 5B. The PCBA includes an SSD backplane sled 502, a first SSD backplane 504, and a second SSD backplane 506. The first SSD backplane 504 and second SSD backplane 506 are PCBs with electronic components mounted thereon. The SSD backplane sled 502 facilitates securing the first SSD backplane 504 and the second SSD backplane 506 to each other. In some implementations, fasteners 508 (e.g., screws) are provided for securing the first SSD backplane 504 to the SSD backplane sled 502 and for securing the second SSD backplane 506 to the SSD backplane sled 502. The first SSD backplane 504 is secured to a first side of the SSD backplane sled 502, and the second SSD backplane 506 is secured to a second side of the SSD backplane sled 502. The first and the second SSD backplanes 504, 506 are secured to opposite sides of the SSD backplane sled 502.

The first SSD backplane 504 includes an SSD connector 512 that connects to the SSD connectors 418 (FIG. 4B). The first SSD backplane 504 includes connector traces 522. The connector traces 522 electrically connect to the SSD connector 512. The first SSD backplane 504 includes a guide 516. In some implementations, the guide 516 is secured with at least one fastener 508. In FIG. 5A, the connector traces 522 are arranged such that a connection can be made to the connector traces 522 in a direction that is orthogonal to the direction of connecting to the SSD connector 512.

Similarly, the second SSD backplane 506 includes an SSD connector 510 that connects to the SSD connectors 418 (FIG. 4B). The second SSD backplane 506 includes connector traces 520. The connector traces 520 electrically connect to the SSD connector 512. The second SSD backplane 506 includes a guide 514. In some implementations, the guide 514 is secured with at least one fastener 508.

The SSD backplane sled 502 can include a first guiding feature 532 and a second guiding feature 530. The first SSD backplane 504 and the second SSD backplane 506 are shaped differently to accommodate the guiding features 532, 530. The first guiding feature 532 and the second guiding feature 530 can be U-shaped guiding features that allow the PCBA 500 to slide into the SSD carrier 400 (FIG. 4C). The SSD backplane sled 502 can also include fasteners 518 for securing the PCBA 500 to the SSD carrier 400 (FIG. 4C).

Figure 6:
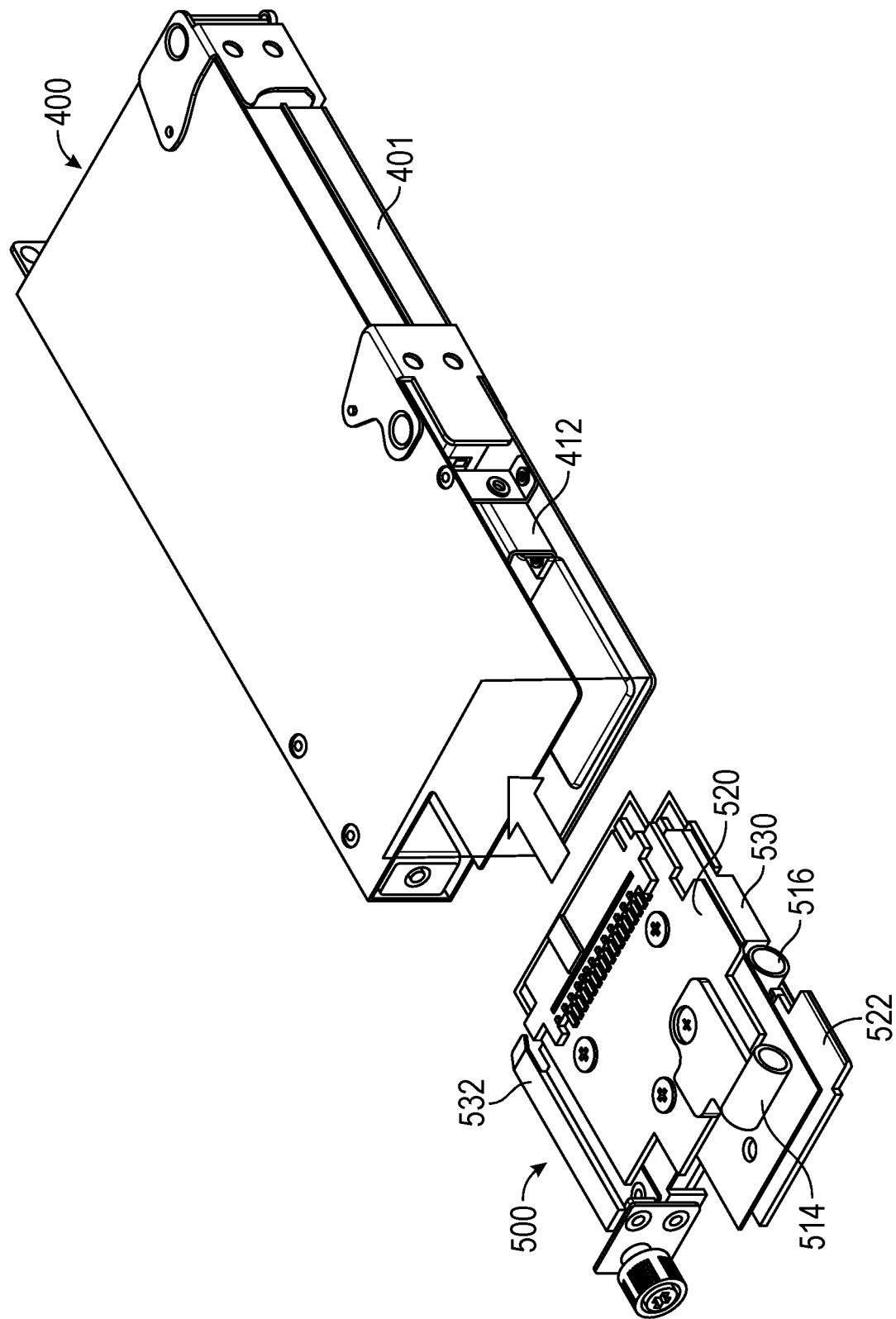
FIG. 6 illustrates the SSD carrier of FIG. 4A receiving the PCBA of FIG. 5B, according to some implementations of the present disclosure.

FIG. 6 illustrates the SSD carrier 400 receiving the PCBA 500, according to some implementations of the present disclosure. The second guiding feature 530 slides into an inner bracket 412. In an implementation, a height of the inner bracket 412 spans the spacing between the second panel 326 and the third panel 328, and the inner bracket 412 is secured to both the second panel 326 and the third panel 328. The inner bracket 412 facilitates positioning the PCBA 500 in a preferred orientation. FIG. 7A illustrates securing the SSD carrier 400 to the PCBA 500 using the fastener 518. In some implementations, the fastener 518 is rotated clockwise to secure the PCBA 500 to the SSD carrier 400. The fastener 518 interfaces with a hole 430 (FIG. 4C) provided on the SSD carrier 400. With the PCBA 500 and the SSDs 401 (FIG. 4B) installed to the SSD carrier 400, the SSD module 320 (FIG. 3B) is assembled. FIG. 7B illustrates a perspective view of the SSD module 320 after the PCBA 500 is installed. The SSD module 320 provides access to the connector traces 520, 522. The guides 514, 516 are also accessible. The connector traces 520, 522 are accessible in a direction orthogonal to the accessibility of the SSD connectors 418 (FIG. 4B).

Figure 8A:
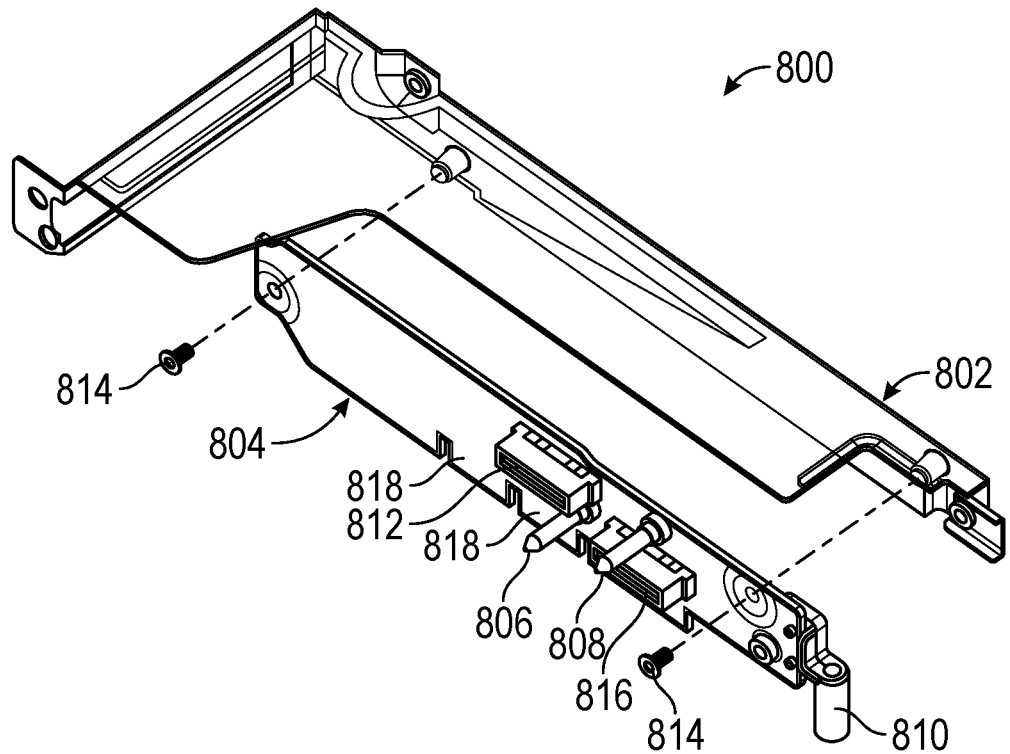
FIG. 8A illustrates components of a first riser module, according to some implementations of the present disclosure.
Figure 8B:
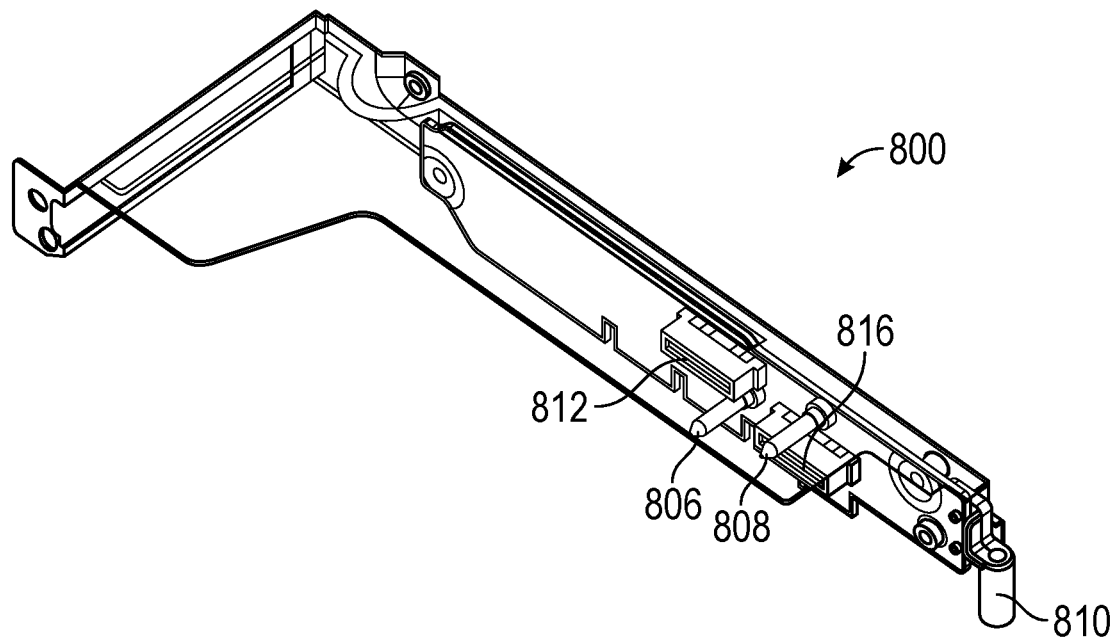
FIG. 8B illustrates the first riser module of FIG. 8A when assembled.

FIG. 8A illustrates components of a first riser module 800, according to some implementations of the present disclosure. FIG. 8B illustrates the first riser module 800 when assembled. The following discussion refers to both FIGS. 8A and 8B. The first riser module 800 includes a riser bracket 802 and a first riser board 804. The first riser board 804 can be affixed to the riser bracket 802 using fasteners 814. The first riser board 804 is a PCB with electronic components. The first riser board 804 includes connecting traces 818 for connecting to a motherboard of a computing system (e.g., the motherboard 118). The first riser board 804 can include a board guide 810 that facilitates installing the first riser module 800 on a motherboard (e.g., the motherboard 118). The first riser board 804 includes one or more SSD connectors (e.g., a first SSD connector 812 and a second SSD connector 816). The SSD connectors 812, 816 provide interfaces for electrically coupling the PCBA 500 (FIG. 6) to the first riser board 804.

Figure 9:
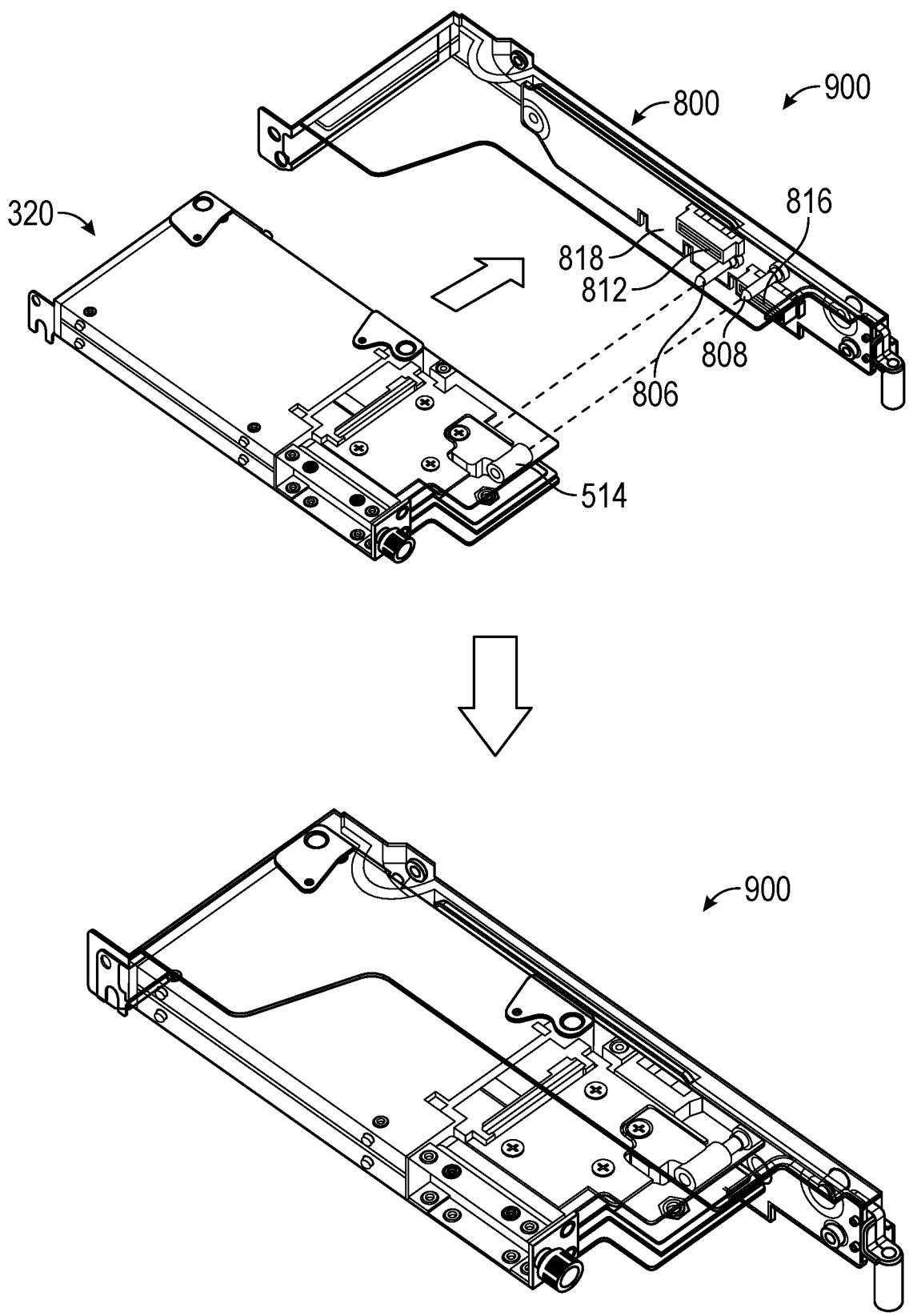
FIG. 9 illustrates attaching the SSD module of FIG. 3B to the first riser module of FIG. 8B.
Figure 10B:
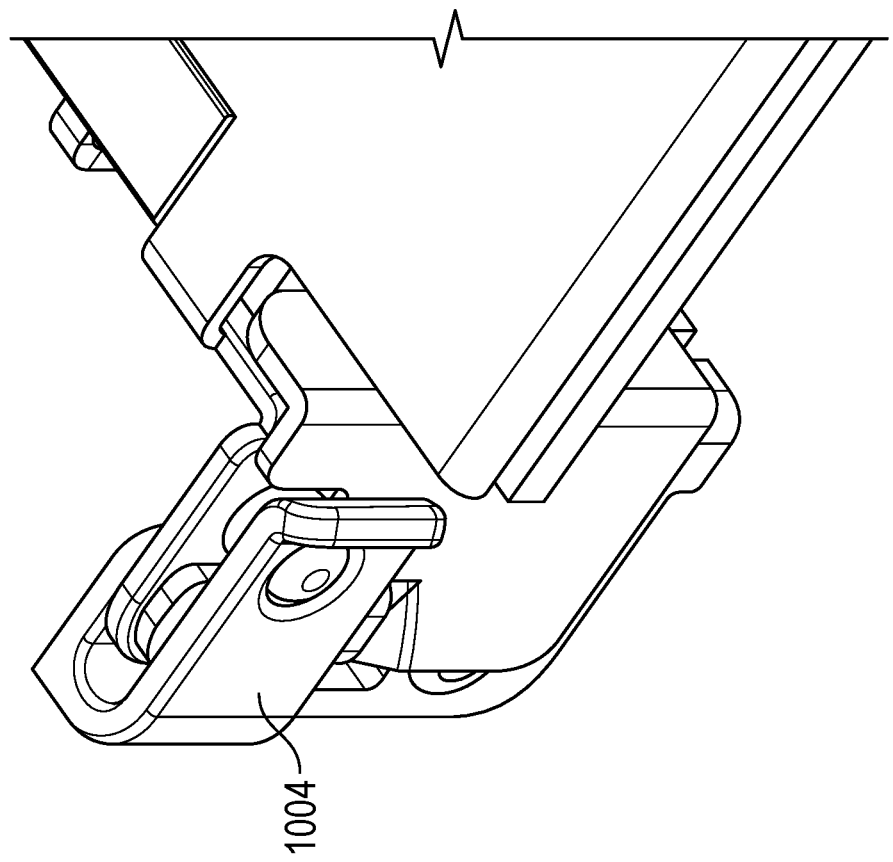
FIG. 10B illustrates a second method of securing the SSD module of FIG. 3B to the first riser module of FIG. 8B, according to some implementations of the present disclosure.
Figure 10A:
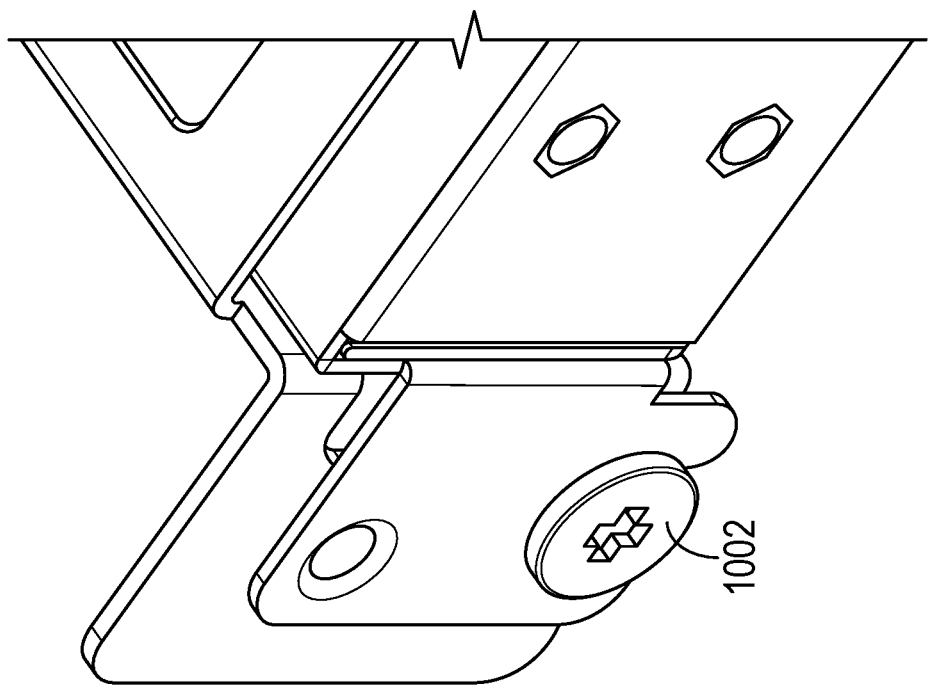
FIG. 10A illustrates a first method of securing the SSD module of FIG. 3B to the first riser module of FIG. 8B, according to some implementations of the present disclosure.

The first riser board 804 includes one or more guiding pins (e.g., a first guiding pin 806 and a second guiding pin 808). The guiding pins 806, 808 couple to the guides 514, 516 (FIG. 6) of the PCBA 500 (FIG. 6). The guiding pins 806, 808 can be received in the holes of the guides 514, 516 (FIG. 6). The guiding pins 806, 808 and the guides 514, 516 (FIG. 6) facilitate placing the SSD module 320 in a preferred orientation and position. FIG. 9 illustrates installing the SSD module 320 to the first riser module 800 to obtain a first module combination 900. Once the SSD module 320 is installed to the first riser module 800, the SSD module 320 can be secured to the first riser module 800 using a fastener 1002, as shown in FIG. 10A, or can be secured to the first riser module 800 using a tool-less latch 1004, as shown in FIG. 10B.

Embodiments of the disclosure provide an SSD module that can be installed in a same position as a PCIe card module in a motherboard. FIG. 11 illustrates the first riser module 800 and a second riser module 1100, according to some implementations of the present disclosure. The first riser module 800 attaches to an SSD module, as described above in connection with FIG. 9. The second riser module 1100 attaches to a PCIe card. The second riser module 1100 can use the same riser bracket 802 with a second riser board 1102. The second riser board 1102 includes connecting traces 1118 for connecting the second riser board 1102 to a motherboard (e.g., the motherboard 118). The second riser board 1102 includes a PCIe connector 1104 for interfacing with a PCIe card (e.g., the PCIe card 300 of FIG. 3A). The second riser board 1102 is similar to the riser card 204 (FIG. 2A). In FIG. 11, the same bracket (the riser bracket 802) can be used to configure the first and second riser modules 800, 1100. Furthermore, the connecting traces 1118 are similar to the connecting traces 818, thus allowing the first riser board 804 and the second riser board 1102 to fit a same connector on the motherboard.

Figure 12B:
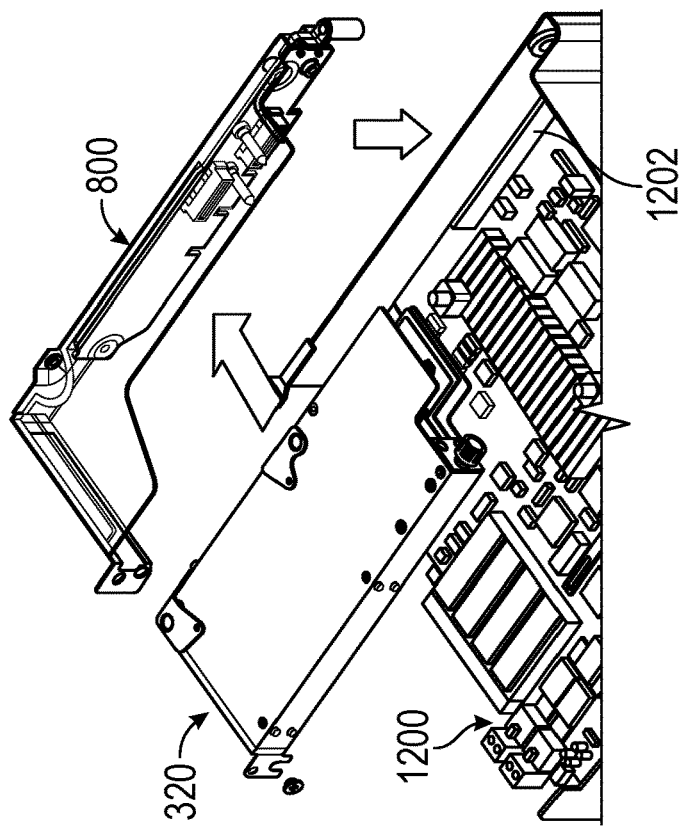
FIG. 12B illustrates attaching the first riser module to the SSD module of FIG. 3B, according to some implementations of the present disclosure.
Figure 12A:
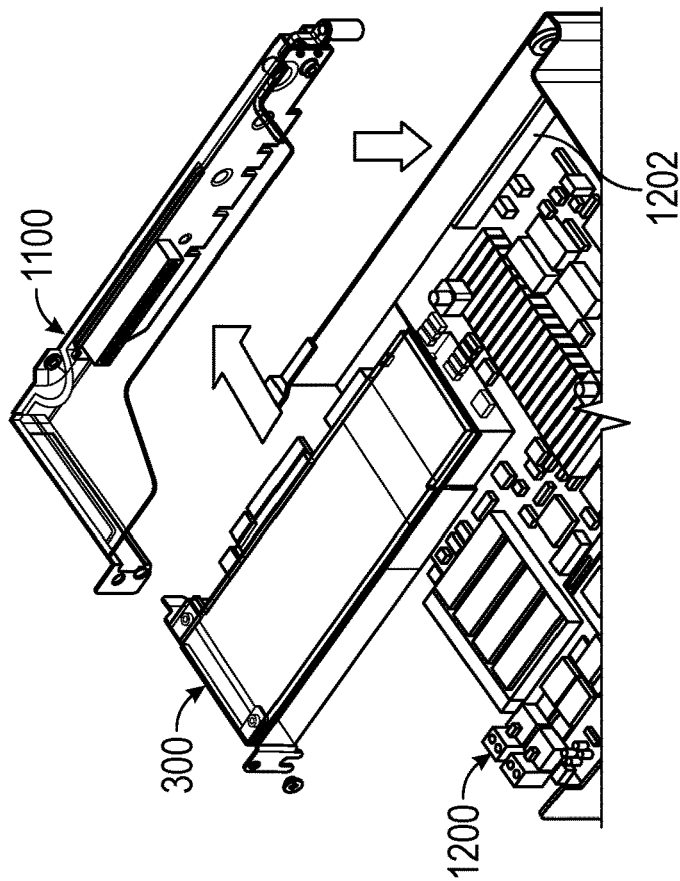
FIG. 12A illustrates attaching the second riser module to the PCIe card of FIG. 3A, according to some implementations of the present disclosure.
Figure 13B:
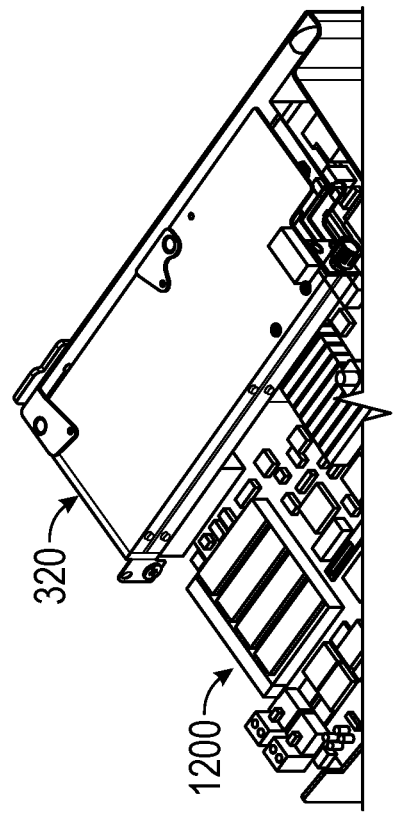
FIG. 13B illustrates installing the SSD module of FIG. 3B at the first location on the computing system of FIG. 13A.
Figure 13A:
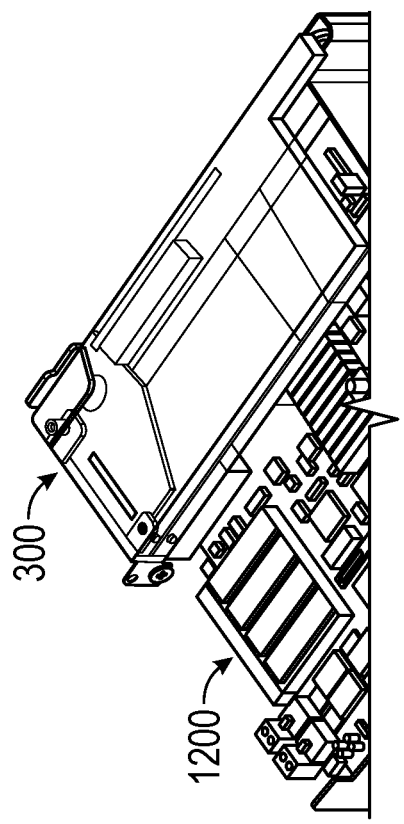
FIG. 13A illustrates installing the PCIe card of FIG. 3A at a first location on a computing system, according to some implementations of the present disclosure.

FIG. 12A illustrates attaching the second riser module 1100 to the PCIe card 300 and placing the combination in a computing system 1200, according to some implementations of the present disclosure. Similarly, FIG. 12B illustrates attaching the first riser module 800 to the SSD module 320 and placing the combination in the computing system 1200, according to some implementations of the present disclosure. A same connector 1202 in the computing system 1200 can be used to connect to the second riser module 1100 and the first riser module 800. FIG. 13A illustrates installing the PCIe card 300 at a first location on the computing system 1200, according to some implementations of the present disclosure. FIG. 13B illustrates that the SSD module 320 can also be installed at the first location on the computing system 1200. Due to the PCIe card 300 and the SSD module 320 having a similar form factor, both take up about the same space in the computing system 1200. One can be swapped out for the other, and the same connection(s) on the motherboard of the computing system 1200 can be used for connecting either the SSD module 320 or the PCIe card 300.

Embodiments of the present disclosure provide several advantages. In previous server systems, PCIe card modules and SSD modules are placed in different locations with different methods of connecting these modules to the motherboard, as discussed above with respect to FIGS. 1, 2A, and 2B. Thus, when a configuration changes, for example, the manufacturer needs to add a PCIe card module or an SSD module, the motherboard will need to be replaced. Embodiments of the present disclosure provide systems and methods for installing two SSDs or a low profile PCIe card at the same location. Therefore, PCIe cards can be installed at the same location as SSDs without having to change motherboards or chassis. Manufacturers thus have more flexibility when providing servers to customers. For example, manufacturers can provide a server with, for example, (1) two PCIe modules and one SSD module, (2) three PCIe modules, (3) two SSD modules and one PCIe module, etc. The manufacturer can make these provisions without having to switch motherboards, since locations and connections for PCIe modules and SSD modules are swappable.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A carrier for solid state devices, the carrier comprising:
a plurality of panels including a first panel, a second panel, and a third panel;
at least one gate attached to the second panel and the third panel, the at least one gate configured to be in one of a first position or a second position, wherein when the at least one gate is in the first position, an opening for receiving solid state devices is at least partially occluded to a first width that is smaller than a length of one of the solid state devices, and when the at least one gate is in the second position, the opening for receiving the solid state devices is increased to a second width that is larger than the length of the one of the solid state devices;
an addition attached to the second panel and the third panel, the addition configured to interface with a printed circuit board assembly (PCBA);
wherein the PCBA includes at least one solid state device (SSD) backplane to which an SSD backplane sled is attached; and wherein a first SSD backplane is attached to a first side of the SSD backplane sled and a second SSD backplane is attached to a second side of the SSD backplane sled, the first side and the second side being opposite sides.

2. The carrier of claim 1, further comprising:
one or more aligning pins provided on the first panel, the one or more aligning pins configured to interface with one or more holes of the solid state devices.

3. The carrier of claim 1, wherein the at least one gate includes a first gate and a second gate, the first gate being pivotable about a first axis and the second gate being pivotable about a second axis that is different from the first axis.

4. The carrier of claim 3, wherein the first gate and the second gate are each configured to pivot between the first position and the second position.

5. The carrier of claim 4, wherein the first gate includes a stub facilitating pivoting between the first position and the second position.

6. The carrier of claim 1, further comprising an inner bracket for receiving the printed circuit board assembly.

7. The carrier of claim 6, wherein the inner bracket is secured to the second panel and the third panel.

8. The carrier of claim 1, wherein the first SSD backplane is shaped differently from the second SSD backplane.

9. The carrier of claim 1, wherein each of the at least one SSD backplane includes an SSD connector for interfacing with solid state drives and connecting traces for interfacing with a riser board.

10. A solid state device (SSD) module comprising:
an SSD carrier including:
a plurality of panels including a first panel, a second panel, and a third panel;
at least one gate attached to the second panel and the third panel, the at least one gate configured to be in one of a first position or a second position, wherein when the at least one gate is in the first position, an opening for receiving solid state devices is at least partially occluded to a first width that is smaller than a length of one of the solid state devices, and when the at least one gate is in the second position, the opening for receiving the solid state devices is increased to a second width that is larger than the length of the one of the solid state devices;
an addition attached to the second panel and the third panel, the addition configured to interface with a printed circuit board assembly (PCBA); and
one or more aligning pins provided on the first panel, the one or more aligning pins configured to interface with one or more holes of the solid state devices; and
the PCBA including at least one SSD backplane;
wherein the PCBA further includes an SSD backplane sled attached to the at least one SSD backplane;
wherein a first SSD backplane is attached to a first side of the SSD backplane sled and a second SSD backplane is attached to a second side of the SSD backplane sled, the first side and the second side being opposite sides.

11. The SSD module of claim 10, wherein the first SSD backplane is shaped differently from the second SSD backplane.

12. The SSD module of claim 10, wherein each of the at least one SSD backplane includes an SSD connector for interfacing with solid state drives and connecting traces for interfacing with a riser board.

13. The SSD module of claim 10, wherein each of the at least one SSD backplane includes guides for positioning the PCBA relative to a riser board.

14. The SSD module of claim 10, wherein dimensions of the SSD module are substantially the same as dimensions of a low profile PCIe card.

15. The SSD module of claim 10, further comprising one or more aligning pins provided on the first panel, the one or more aligning pins configured to interface with one or more holes of the solid state devices.

16. The SSD module of claim 10, wherein the at least one gate includes a first gate and a second gate, the first gate being pivotable about a first axis and the second gate being pivotable about a second axis that is different from the first axis.

17. A computing device, comprising:
a chassis;
a motherboard coupled to the chassis;
an SSD module including:
an SSD carrier including:
a plurality of panels including a first panel, a second panel, and a third panel;
at least one gate attached to the second panel and the third panel, the at least one gate configured to be in one of a first position or a second position, wherein when the at least one gate is in the first position, an opening for receiving solid state devices is at least partially occluded to a first width that is smaller than a length of one of the solid state devices, and when the at least one gate is in the second position, the opening for receiving the solid state devices is increased to a second width that is larger than the length of the one of the solid state devices; and
an addition located along the first panel and attached to the second panel and the third panel, the addition configured to interface with a printed circuit board assembly (PCBA); and
the PCBA including at least one SSD backplane; and
a first riser module coupled to the SSD module, the first riser module configured to couple the SSD module to the motherboard via the PCBA;
wherein the first riser module includes a riser bracket and a first riser board, the first riser board including at least one connector configured to receive connecting traces of the PCBA; and
wherein the first riser board further includes at least one guiding pin configured to interface with guides provided on the PCBA.

18. The computing device of claim 17, wherein the first riser module connects to the motherboard using a same connection method as a PCIe module.

19. The computing device of claim 17, wherein dimensions of the SSD module are substantially the same as dimensions of a low profile PCIe card.

20. The computing device of claim 17, wherein the SSD module is installed at a first location on the motherboard, the first location being able to accommodate either an SSD module installation or a PCIe card module installation.

* * * * *